(12) United States Patent
Terwilliger et al.

(10) Patent No.: US 11,603,798 B1
(45) Date of Patent: Mar. 14, 2023

(54) CRYOGENICALLY ASSISTED EXHAUST CONDENSATION

(71) Applicant: Raytheon Technologies Corporation, Farmington, CT (US)

(72) Inventors: Neil J. Terwilliger, Cheshire, CT (US); Joseph B. Staubach, Colchester, CT (US); Joseph E. Turney, Amston, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/669,680

(22) Filed: Feb. 11, 2022

(51) Int. Cl.
  *F02C 7/224* (2006.01)
  *F02C 3/30* (2006.01)
  *F02C 7/18* (2006.01)

(52) U.S. Cl.
  CPC .......... *F02C 7/224* (2013.01); *F02C 3/30* (2013.01); *F02C 7/18* (2013.01); *F05D 2220/323* (2013.01); *F05D 2260/207* (2013.01); *F05D 2260/213* (2013.01); *F05D 2260/232* (2013.01); *F05D 2260/606* (2013.01)

(58) Field of Classification Search
  CPC .... F02C 7/224; F02C 3/22; F02C 7/36; F02C 7/12; F02C 3/30; F01D 25/32; F02K 25/06; F01K 23/106; F05D 2220/323; F05D 2220/207; F05D 2220/232; F05D 2220/606
  See application file for complete search history.

(56) References Cited

U.S. PATENT DOCUMENTS

| 2017/0268423 | A1* | 9/2017 | Schwarz | B64D 15/04 |
| 2020/0088098 | A1* | 3/2020 | Roberge | F02C 7/143 |
| 2021/0207500 | A1* | 7/2021 | Klingels | F01K 23/10 |
| 2021/0262383 | A1* | 8/2021 | Uechi | F02C 6/18 |
| 2022/0297844 | A1* | 9/2022 | Mackin | B64D 27/24 |

* cited by examiner

*Primary Examiner* — Todd E Manahan
*Assistant Examiner* — Rodolphe Andre Chabreyrie
(74) *Attorney, Agent, or Firm* — Cantor Colburn LLP

(57) ABSTRACT

Aircraft engines include a burner section and a turbine section arranged along a shaft, wherein an exhaust from the burner section is directed through the turbine section to drive rotation of the turbine section and a core flow path passes through the burner section and then the turbine section. A condenser assembly is arranged downstream of the turbine section along the core flow path. A cryogenic fuel source is configured to supply fuel to the burner section along a fuel line passing through the condenser assembly and the fuel within the fuel line is configured to pick up heat from the exhaust from the burner section and condense water therefrom.

20 Claims, 6 Drawing Sheets

CRYOGENICALLY ASSISTED EXHAUST CONDENSATION

TECHNICAL FIELD

The present disclosure relates generally to turbine engines and aircraft engines, and more specifically to aircraft engines that employ cryogenic fuels and using such fuel to assist exhaust condensation.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section drives the compressor section to rotate. In some configurations, a fan is also connected to the shaft and is driven to rotate via rotation of the turbine.

Typically, hydrocarbon-based fuel is employed for combustion onboard an aircraft, in the gas turbine engine. Alternative fuels have been considered, but suffer from various challenges for implementation, particularly on aircraft. Hydrogen-based and/or methane-based fuels are viable effective alternatives which may not generate the same combustion byproducts as conventional hydrocarbon-based fuels. The use of hydrogen and/or methane, as a gas turbine fuel source, may require very high efficiency propulsion, in order to keep the volume of the fuel low enough to feasibly carry on an aircraft. That is, because of the added weight associated with such liquid/compressed/supercritical fuels, such as related to vessels/containers and the amount (volume) of fuel required, improved efficiencies associated with operation of the gas turbine engine may be necessary.

BRIEF SUMMARY

According to some embodiments, aircraft engines are provided. The aircraft engines include a burner section and a turbine section arranged along a shaft, wherein an exhaust from the burner section is directed through the turbine section to drive rotation of the turbine section and a core flow path passes through the burner section and then the turbine section, a condenser assembly arranged downstream of the turbine section along the core flow path, and a cryogenic fuel source configured to supply fuel to the burner section along a fuel line. The fuel line passes through the condenser assembly and the fuel within the fuel line is configured to pick up heat from the exhaust from the burner section and condense water therefrom.

In addition to one or more of the features described above, or as an alternative, embodiments of the aircraft engines may include an evaporator configured to convert the condensed water from liquid water to steam.

In addition to one or more of the features described above, or as an alternative, embodiments of the aircraft engines may include that the steam is injected into the burner section.

In addition to one or more of the features described above, or as an alternative, embodiments of the aircraft engines may include that the steam is injected into the turbine section.

In addition to one or more of the features described above, or as an alternative, embodiments of the aircraft engines may include that the evaporator is arranged along the core flow path between the turbine section and the condenser assembly.

In addition to one or more of the features described above, or as an alternative, embodiments of the aircraft engines may include that the evaporator is a boiler arranged separate from the core flow path.

In addition to one or more of the features described above, or as an alternative, embodiments of the aircraft engines may include that the boiler is an electric boiler.

In addition to one or more of the features described above, or as an alternative, embodiments of the aircraft engines may include that the burner section is configured to combust hydrogen fuel therein.

In addition to one or more of the features described above, or as an alternative, embodiments of the aircraft engines may include that the cryogenic fuel source is a cryogenic fuel tank configured to supply hydrogen fuel to the burner section.

In addition to one or more of the features described above, or as an alternative, embodiments of the aircraft engines may include that the condensed water is stored in a water storage.

In addition to one or more of the features described above, or as an alternative, embodiments of the aircraft engines may include a water pump configured to pump water from the water storage to at least one of the burner section or the turbine section.

In addition to one or more of the features described above, or as an alternative, embodiments of the aircraft engines may include a fan and a bypass duct configured to direct bypass air past the burner section and the turbine section.

In addition to one or more of the features described above, or as an alternative, embodiments of the aircraft engines may include that the bypass air is directed through a portion of the condenser assembly to assist the condensing of water from the exhaust from the burner section.

In addition to one or more of the features described above, or as an alternative, embodiments of the aircraft engines may include that the condenser assembly comprises (i) a burner exhaust-to-air heat exchanger and (ii) a burner exhaust-to-fuel heat exchanger.

In addition to one or more of the features described above, or as an alternative, embodiments of the aircraft engines may include that the condenser assembly further comprises a water separator arranged downstream from the burner exhaust-to-air heat exchanger and the burner exhaust-to-fuel heat exchanger in a direction of the core flow path.

In addition to one or more of the features described above, or as an alternative, embodiments of the aircraft engines may include that the burner exhaust-to-air heat exchanger and the burner exhaust-to-fuel heat exchanger are separate heat exchangers.

In addition to one or more of the features described above, or as an alternative, embodiments of the aircraft engines may include that the condenser assembly comprises three cooling flow paths comprising: (i) a cooling air flow path, (ii) an oxygen fuel flow path, and (iii) a hydrogen fuel flow path.

In addition to one or more of the features described above, or as an alternative, embodiments of the aircraft engines may include that an exhaust from the burner section passes through the condenser assembly to sequentially thermally interact with the cooling air flow path, then the oxygen fuel flow path, and then the hydrogen fuel flow path to condense water from the exhaust of the burner section.

In addition to one or more of the features described above, or as an alternative, embodiments of the aircraft engines may include that the condenser is configured to extract up to 70% of the water content from an exhaust from the burner section.

In addition to one or more of the features described above, or as an alternative, embodiments of the aircraft engines may include a compressor section arranged along the core flow path upstream from the burner section and a fan section arranged along the core flow path upstream from the burner section and the compressor section.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
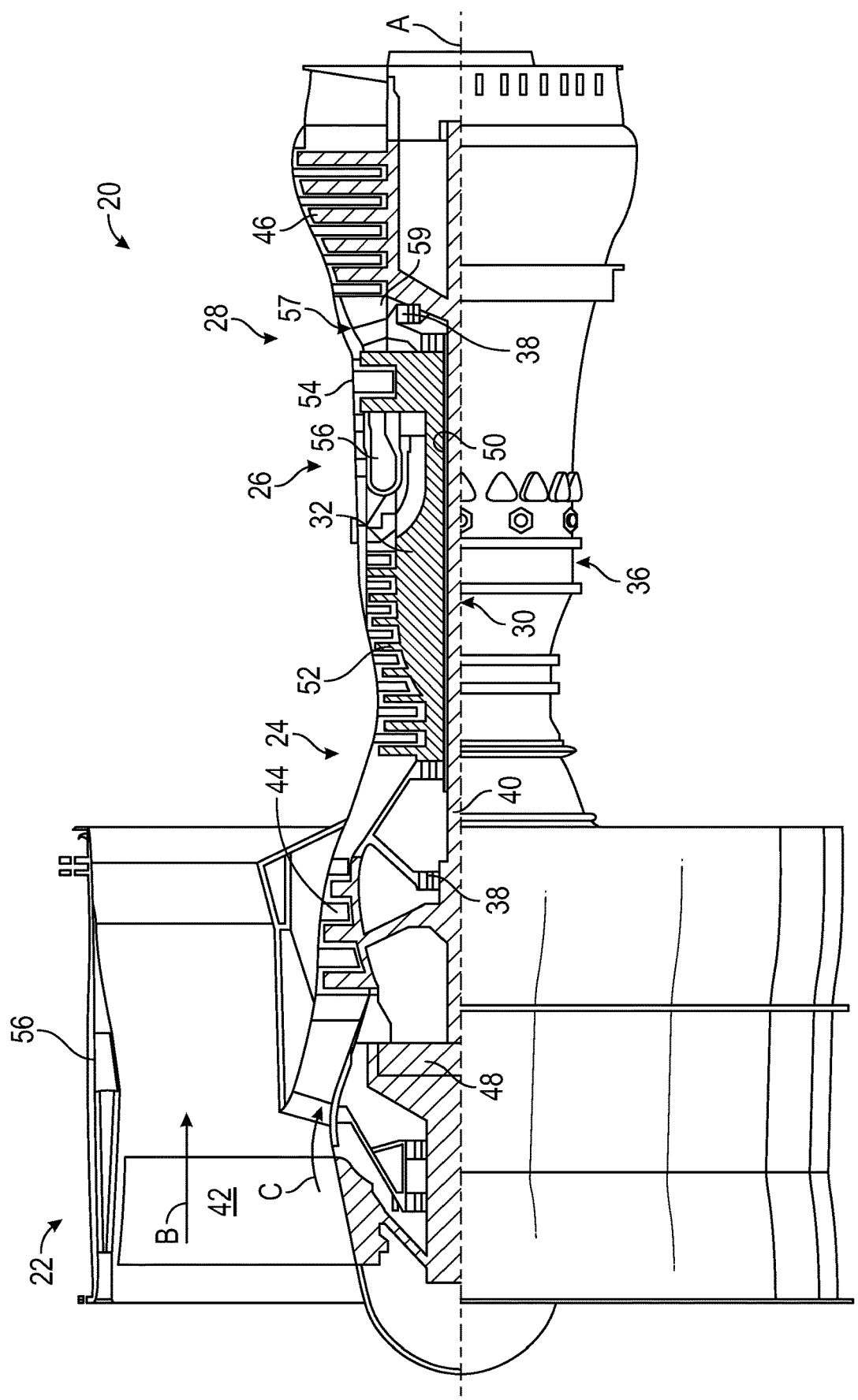
FIG. 1 is a schematic cross-sectional illustration of a gas turbine engine architecture that may employ various embodiments disclosed herein.

FIG. 1 schematically illustrates a gas turbine engine 20. As illustratively shown, the gas turbine engine 20 is configured as a two-spool turbofan that has a fan section 22, a compressor section 24, a combustor section 26, and a turbine section 28. The illustrative gas turbine engine 20 is merely for example and discussion purposes, and those of skill in the art will appreciate that alternative configurations of gas turbine engines may employ embodiments of the present disclosure. The fan section 22 includes a fan 42 that is configured to drive air along a bypass flow path B in a bypass duct defined in a fan case 15. The fan 42 is also configured to drive air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

In this two-spool configuration, the gas turbine engine 20 includes a low speed spool 30 and a high speed spool 32 mounted for rotation about an engine central longitudinal axis A relative to an engine static structure 36 via one or more bearing systems 38. It should be understood that various bearing systems 38 at various locations may be provided, and the location of bearing systems 38 may be varied as appropriate to a particular application and/or engine configuration.

The low speed spool 30 includes an inner shaft 40 that interconnects the fan 42 of the fan section 22, a first (or low) pressure compressor 44, and a first (or low) pressure turbine 46. The inner shaft 40 is connected to the fan 42 through a speed change mechanism, which, in this illustrative gas turbine engine 20, is as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the combustor section 26 between the high pressure compressor 52 and the high pressure turbine 54. A mid-turbine frame 57 of the engine static structure 36 is arranged between the high pressure turbine 54 and the low pressure turbine 46. The mid-turbine frame 57 may be configured to support one or more of the bearing systems 38 in the turbine section 28. The inner shaft 40 and the outer shaft 50 are concentric and rotate via the bearing systems 38 about the engine central longitudinal axis A which is collinear with their longitudinal axes.

The core airflow through core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 (e.g., vanes) which are arranged in the core airflow path C. The turbines 46, 54 rotationally drive the respective low speed spool 30 and high speed spool 32 in response to the expansion of the core airflow. It will be appreciated that each of the positions of the fan section 22, the compressor section 24, the combustor section 26, the turbine section 28, and geared architecture 48 or other fan drive gear system may be varied. For example, in some embodiments, the geared architecture 48 may be located aft of the combustor section 26 or even aft of the turbine section 28, and the fan section 22 may be positioned forward or aft of the location of the geared architecture 48.

The gas turbine engine 20 in one example is a high-bypass geared aircraft engine. In some such examples, the engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3 and the low pressure turbine 46 has a pressure ratio that is greater than about five (5). In one non-limiting embodiment, the bypass ratio of the gas turbine engine 20 is greater than about ten (10:1), a diameter of the fan 42 is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. In some embodiments, the geared architecture 48 may be an epicycle gear train, such as a planetary gear system or other gear system, with a gear reduction ratio of greater than about 2.3:1. It should be understood, however, that the above parameters are only for example and explanatory of one non-limiting embodiment of a geared architecture engine and that the present disclosure is applicable to other gas turbine engines including turbojets or direct drive turbofans, turboshafts, or turboprops.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Gas turbine engines generate substantial amounts of heat that is exhausted from the turbine section 28 into a surrounding atmosphere. This expelled exhaust heat represents wasted energy and can be a large source of inefficiency in gas turbine engines. Further, transitioning away from hydrocarbon-based engines may be significant advantages, as described herein.

Figure 2:
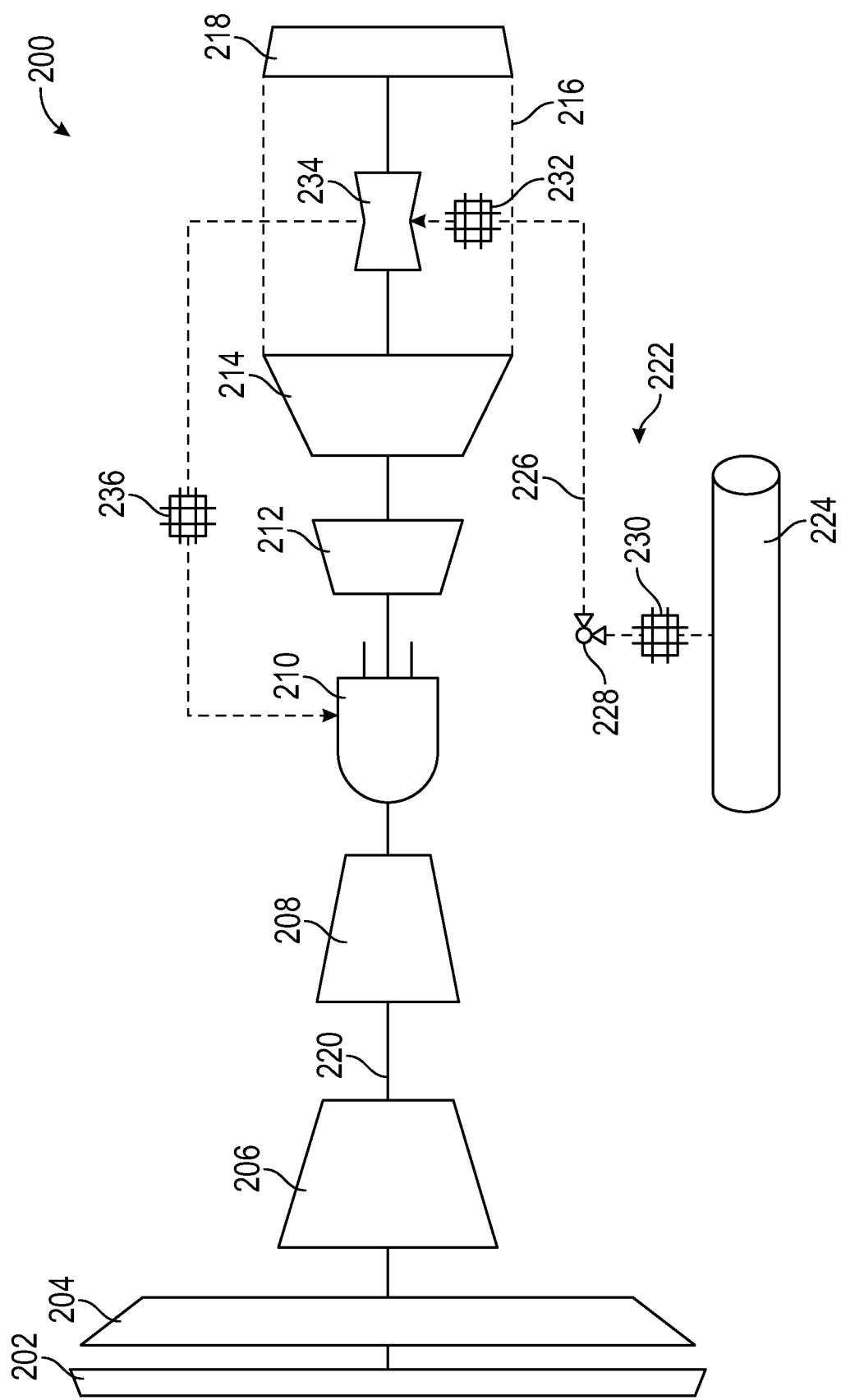
FIG. 2 is a schematic illustration of a turbine engine system in accordance with an embodiment of the present disclosure that employs a non-hydrocarbon fuel source.

Turning now to FIG. 2, a schematic diagram of a turbine engine system 200 in accordance with an embodiment of the present disclosure is shown. The turbine engine system 200 may be similar to that shown and described above but is configured to employ a non-hydrocarbon fuel source, such as a cryogenic fuel, including but not limited to hydrogen. The turbine engine system 200 includes an inlet 202, a fan 204, a low pressure compressor 206, a high pressure compressor 208, a combustor 210, a high pressure turbine 212, a low pressure turbine 214, a core nozzle 216, and an outlet 218. A core flow path is defined through, at least, the compressor 206,208, the turbine 212, 214, and the combustor sections 210. The compressor 206, 208, the turbine 212, 214, and the fan 204 are arranged along a shaft 220.

As shown, the turbine engine system 200 includes a cryogenic fuel system 222. The cryogenic fuel system 222 is configured to supply a cryogenic fuel from a cryogenic fuel tank 224 to the combustor 210 for combustion thereof. In this illustrative embodiment, the cryogenic fuel may be supplied from the cryogenic fuel tank 224 to the combustor 210 through a fuel supply line 226. The fuel supply line 226 may be controlled by a flow controller 228 (e.g., pump(s), valve(s), or the like). The flow controller 228 may be configured to control a flow through the fuel supply line 226 based on various criteria as will be appreciated by those of skill in the art. For example, various control criteria can include, without limitation, target flow rates, target turbine output, cooling demands at one or more heat exchangers, target flight envelopes, etc.

As shown, between the cryogenic fuel tank 224 and the flow controller 228 may be one or more heat exchangers 230, which can be configured to provide cooling to various systems onboard an aircraft by using the cryogenic fuel (e.g., liquid hydrogen) as a cold-sink. Such hydrogen heat exchangers 230 may be configured to warm the hydrogen and aid in a transition from a liquid state to a supercritical fluid or gaseous state for combustion within the combustor 210. The heat exchangers 230 may receive the hydrogen fuel directly from the cryogenic fuel tank 224 as a first working fluid and a component-working fluid for a different onboard system. For example, the heat exchanger 230 may be configured to provide cooling to power electronics of the turbine engine system 200 (or other aircraft power electronics). In other embodiments, the arrangement of the heat exchanger 230 and the flow controller 228 (or a flow controller element, such as a pump) may be reversed. In some such embodiments, a pump, or other means to increase a pressure of the hydrogen sourced from the cryogenic fuel tank 224, may be arranged upstream of the heat exchanger 230. This pumping or pressure increase may be provided to pump the hydrogen to high pressure as a liquid (low power). It will be appreciated that other configurations and arrangements are possible without departing from the scope of the present disclosure.

In some non-limiting embodiments, an optional secondary fluid circuit may be provided for cooling one or more aircraft loads. In this secondary fluid circuit, a secondary fluid may be configured to deliver heat from the one or more aircraft loads to one or more liquid hydrogen heat exchanger. As such, heating of the hydrogen and cooling of the secondary fluid may be achieved. The above described configurations and variations thereof may serve to begin raising a temperature of the hydrogen fuel to a desired temperature for efficient combustion in the combustor 210.

The hydrogen may then pass through an optional supplemental heating heat exchanger 236. The supplemental heating heat exchanger 236 may be configured to receive hydrogen as a first working fluid and as the second working fluid may receive one or more aircraft system fluids, such as, without limitation, engine oil, environmental control system fluids, pneumatic off-takes, or cooled cooling air fluids. As such, the hydrogen will be heated, and the other fluid may be cooled. The hydrogen will then be injected into the combustor 210 through one or more hydrogen injectors, as will be appreciated by those of skill in the art.

When the hydrogen is directed along the flow supply line 226, the hydrogen can pass through a core flow path heat exchanger 232 (e.g., an exhaust waste heat recovery heat exchanger) or other type of heat exchanger. In this embodiment, the core flow path heat exchanger 232 is arranged in the core flow path downstream of the combustor 210, and in some embodiments, downstream of the low pressure turbine 214. In this illustrative embodiment, the core flow path heat exchanger 232 is arranged downstream of the low pressure turbine 214 and at or proximate the core nozzle 216 upstream of the outlet 218. As the hydrogen passes through the core flow path heat exchanger 232, the hydrogen will pick up heat from the exhaust of the turbine engine system 200. As such, the temperature of the hydrogen will be increased.

The heated hydrogen may then be passed into an expansion turbine 234. As the hydrogen passes through the expansion turbine 234 the hydrogen will be expanded. The process of passing the hydrogen through the expansion turbine 234 cools the hydrogen and extracts useful power through the expansion process. Because the hydrogen is heated from a cryogenic or liquid state in the cryogenic fuel tank 224 through the various mechanisms along the flow supply line 226, engine thermals may be improved.

The use of hydrogen fuel in a gas turbine engine (e.g., in combustion) causes the generation of water. In such systems, steam capture may provide benefits, but condenser pressure loss may be prohibitive to capitalize on capturing steam from the exhaust. Embodiments of the present disclosure are directed to condensing steam from an exhaust stream without or with minimal fan duct pressure losses, thus engine efficiency is maintained while capturing steam from the flow. Hydrogen-powered engines can produce more than twice the water vapor than Jet-A-powered engines. Such hydrogen-powered systems may have smaller core sizes, making the trade of steam capture more favorable on hydrogen-powered engines. Steam can be condensed with a cold source, such as fan air, but fan air through a large condenser incurs significant drag. Such penalty in drag due to a large condenser could result in a 10-20% overall efficiency penalty. This is due to the quantity of heat that needs to be rejected and because the delta temperature between the steam and the fan air decreases as the steam approaches condensation. Accordingly, in accordance with embodiments of the present disclosure, heat rejection from a burner exhaust stream is achieved using fan air and/or ram air. For example, in some embodiments, heat rejection in a fan stream or a ram air stream is achievable by smaller, lower pressure loss heat exchanger if the final stages of condensation can be handled by rejecting the heat into a much colder source, such as in a cold or cryogenic fuel.

Figure 3:
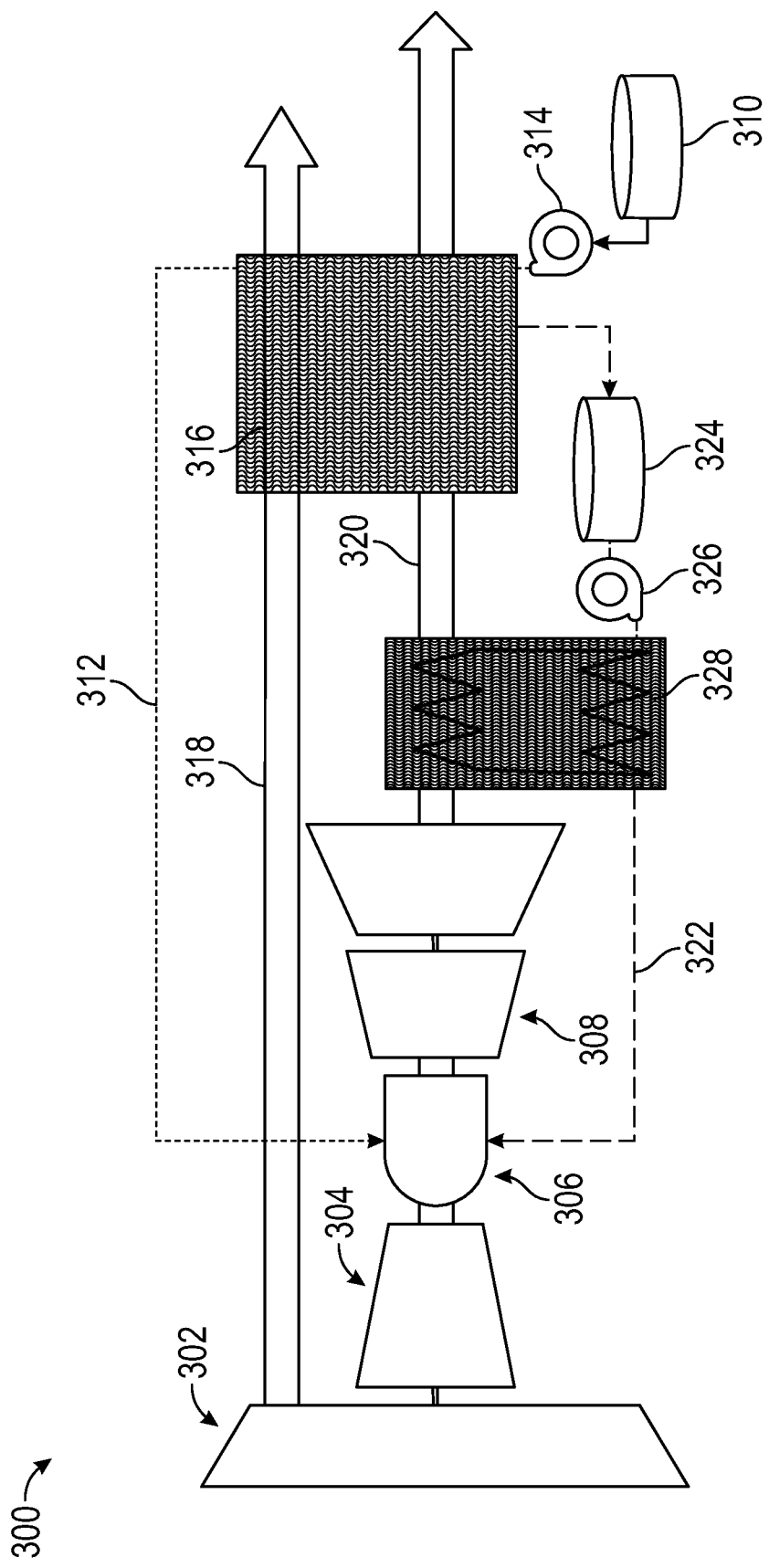
FIG. 3 is a schematic diagram of a hydrogen combustion engine in accordance with an embodiment of the present disclosure.

Turning now to FIG. 3, a schematic diagram of a hydrogen combustion engine 300 in accordance with an embodiment of the present disclosure. The hydrogen combustion engine 300 includes a fan section 302, a compressor section 304, a burner section 306, and a turbine section 308. The compressor section 304, the burner section 306, and the turbine section 308 define a Brayton cycle of the hydrogen combustion engine 300. The burner section 306 includes a combustion chamber configured to mix and burn a fuel, such as hydrogen, the combustion of which generates gaseous water as a byproduct of the combustion operation. The hydrogen fuel is sourced from a cryogenic fuel tank 310. The cryogenic fuel tank 310 is employed to store the hydrogen fuel at cryogenic temperatures in order to reduce the size of the fuel tank. The fuel may be stored as a liquid within the cryogenic fuel tank 310 and converted to a gaseous state prior to injection into the burner section. The fuel is passed through a fuel line 312 by operation of a pump 314 or the like. The fuel may be passed through various heat exchangers, pumps, or the like (not shown) along the fuel line 312. Such components may be used to alter a temperature and/or pressure of the fuel prior to injection into the burner for combustion.

In this illustrative embodiment, the fuel sourced from the cryogenic fuel tank 310 is passed through a condenser assembly 316 arranged downstream, along a core flow 320, from the turbine section 308 and upstream of an exhaust nozzle exit of the hydrogen combustion engine 300. The condenser assembly 316 is arranged to receive two relatively hot fluids (as compared to the cold fuel from the fuel tank 310). As shown, bypass flow 318 is directed from the fan section 302 to the condenser assembly 316 and bypasses the hot portions of the hydrogen combustion engine 300 (e.g., bypasses the burner section 306). The condenser assembly 316 is also arranged to receive relatively hotter air (combustion byproducts) from the core flow 320 that is an exhaust stream from the burner section 306 that is expanded through the turbine section 308. The expansion of the combustion exhaust through the turbine section 308 is used to generate work (e.g., drive rotation of a shaft of the hydrogen combustion engine 300). As such, the condenser assembly 316 is configured to cause a first heat exchange from the relatively hotter core flow 320 to the bypass flow 318, and a second heat exchange from the core flow 320 to the relatively cooler fuel and thus the fuel may be heated to appropriate temperatures for burning (e.g., convert from liquid to gaseous state). It will be appreciated, and as noted above, that other heat exchangers, pumps, or other mechanisms may be used control the temperature and/or pressure of the fuel prior to injection into the burner section 306 for combustion thereof.

As the fuel is passed through the condenser assembly 316, the cold fuel causes condensation of the air of the exhaust in the core flow 320 within the condenser assembly 316 to generate water which can be condensed from the exhaust from the combustor section 306. For example, as a liquid (cold) hydrogen fuel is passed through the condenser assembly 316, the hot temperature of the core flow 320 may be cooled sufficiently to cause water to condense from a vapor form into liquid water. In accordance with embodiments of the present disclosure, the final stages of condensation within the condenser assembly 316 may be achieved through rejecting heat into the much colder source of fuel (e.g., liquid hydrogen fuel).

The water from the exhausted core flow 320 may then be condensed out as the combustion exhaust passes through the condenser assembly 316. In some embodiments, a water collector or water separator may be used in combination with the condenser to ensure extraction thereof. The water may then pass through a water line 322 and may be collected within a water storage 324. The liquid water from the water storage 324 may be pumped from the water storage 324 using a water pump 326 and passed through an evaporator 328. The evaporator 328 is a water-core flow heat exchanger that is configured to vaporize the liquid water to generate steam or water vapor. That is, the evaporator 328 is an exhaust heat-heat exchanger. The vaporized water may then be injected into the burner section 306 (e.g., into the combustion chamber thereof) to increase efficiency of the combustion process.

Figure 4:
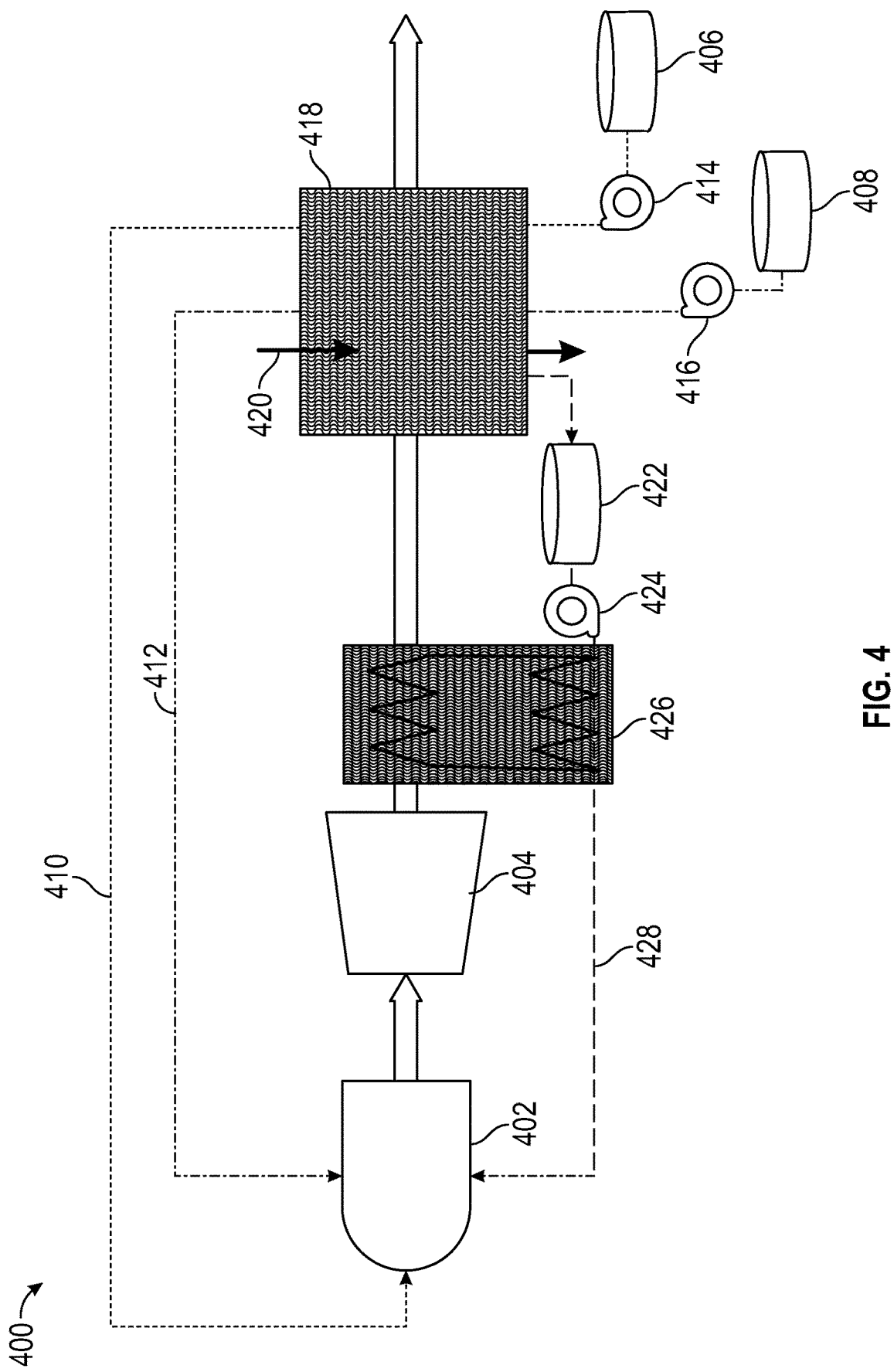
FIG. 4 is a schematic diagram of a hydrogen combustion engine in accordance with an embodiment of the present disclosure.

Turning now to FIG. 4, a schematic diagram of a hydrogen combustion engine 400 in accordance with an embodiment of the present disclosure is shown. The hydrogen combustion engine 400 includes a burner section 402 and a turbine section 404. The burner section 402 includes a combustion chamber configured to mix and burn a fuel, such as hydrogen and oxygen (e.g., no ambient air flow as used in the embodiment of FIG. 3). Hydrogen fuel is sourced from a first fuel tank 406 which stores a hydrogen fuel as a liquid and oxygen fuel is sourced from a second fuel tank 408 which stores an oxygen fuel as a liquid. The liquid fuel is passed through respective fuel lines 410, 412 by operation of respective pumps 414, 416 or the like and is thermally treated to transition the fuels from a liquid to a gaseous state for combustion within the burner section 402. It will be appreciated that the cold/liquid fuel may be passed through various heat exchangers, pumps, or the like (not shown) along the fuel lines 410, 412. Such components, in combination with a condenser assembly 418, may be used to alter a temperature and/or pressure of the fuel prior to injection into the burner for combustion.

In this embodiment, the condenser assembly 418 is configured to operate similar to that described above. Specifically, the condenser assembly 418 is configured to employ cold fuel and/or cool air 420 (e.g., ambient air, ram air, etc.) to provide a heat sink for combustion exhaust gases for condensation of water vapor from the exhaust gases within the condenser assembly 418, in combination with downstream cold sinks in the fuel lines 410, 412. In accordance with embodiments of the present disclosure, the final stages of condensation within the condenser assembly 418 may be achieved through rejecting heat into the much colder source of fuel (e.g., liquid hydrogen and/or liquid oxygen).

The extracted liquid water may be collected within a water storage 422. The liquid water from the water storage 422 may be pumped from the water storage 422 using a water pump 424 and passed through an evaporator 426 along a water line 428. The evaporator 426 is a water-core flow heat exchanger that is configured to vaporize the liquid water to generate steam or water vapor. That is, the evaporator 426 is an exhaust heat-heat exchanger arranged downstream from the burner section 402 and the turbine section 404 and configured to impart heat into the liquid water within the evaporator 426. The vaporized water may then be injected into the burner section 402 (e.g., into the combustion chamber thereof) to increase efficiency of the combustion process and/or into the turbine section 404 which can increase condensation and/or begin condensation of the combustion output prior to the downstream condenser assembly 418.

Figure 5:
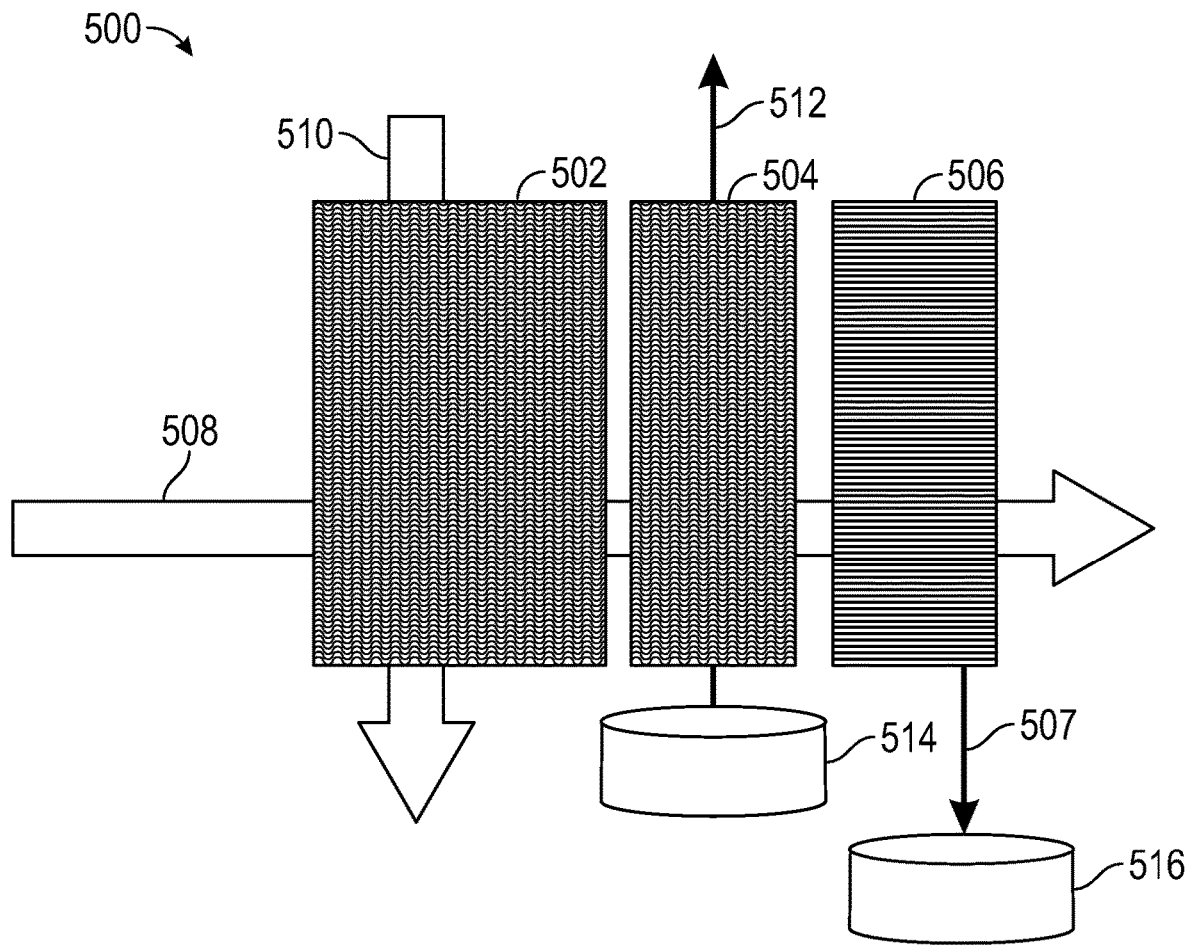
FIG. 5 is a schematic illustration of a condenser assembly in accordance with an embodiment of the present disclosure.

Turning now to FIG. 5, a schematic illustration of a condenser assembly 500 in accordance with an embodiment of the present disclosure is shown. The condenser assembly 500 may be used with hydrogen burning engines, as shown and described above. The condenser assembly 500, in this embodiment, if formed of a set of heat exchangers arranged in series and configured to cool a core airflow (e.g., combustion exhaust) for extraction of water from such core airflow. As shown, the condenser assembly 500 includes a first heat exchanger 502, a second heat exchanger 504, and a water separator 506. The heat exchangers 502, 504 and water separator 506 are arranged in series along a core flow 508.

The first heat exchanger 502 may be configured as a core flow-to-air heat exchanger. The core flow 508 (e.g., combustion exhaust) is passed through the first heat exchanger 502 as a first working fluid and a cooling airflow 510 is passed through the first heat exchanger 502 as a second working fluid. In this configuration, the cooling airflow 510 operates as a first heat sink to cool the core flow 508. The air of the cooling airflow 510 may be bypass air, fan duct air, ram air, or other air sourced, for example, from ambient.

Downstream from the first heat exchanger 502 along the core flow 508 is the second heat exchanger 504. The core flow 508 is passed through the second heat exchanger 504 as a first working fluid and a fuel flow 512 is passed through the second heat exchanger 504 as a second working fluid. In this configuration, the fuel flow 512 is sourced from a cryogenic fuel tank 514 and may include a cold or cryogenic fuel passing therethrough. This cold fuel further cools the core flow 508 while simultaneous raising the temperature of the cold fuel (e.g., cold fuel is a heat sink) and the fuel may be warmed in preparation for injection into a combustor or burner, as described above.

As the cooled core flow 508 exits the second heat exchanger 504, the core flow 508 is passed into the water separator 506 where liquid water 507 is extracted from the core flow 508. The liquid water 507 may be directed into a water storage 516. The water storage 516 may be fluidly connected to one or more locations on a hydrogen burning engine for injection of water (e.g., in the form of steam) into the core flow 508 upstream of the first heat exchanger 502 (e.g., in a burner section or turbine section). Although illustratively shown with the first and second heat exchangers 502, 504 as separate/distinct structures, such configuration is not to be limiting. For example, in some embodiments, rather than two separate heat exchangers/structures, a single unitary structure with distinct flow paths therethrough (e.g., for core flow 508, cooling airflow 510, and fuel flow 512) may be employed without departing from the scope of the present disclosure. Further, in some embodiments, a second fuel flow may be passed through an additional heat exchanger or additional flow path through a single structure configuration. Such second fuel may be liquid oxygen, such as shown in the embodiment of FIG. 4. In such configurations, the oxygen path may be arranged upstream of a hydrogen path relative to a direction of the core flow 508 (e.g., as schematically shown in FIG. 4).

Figure 6:
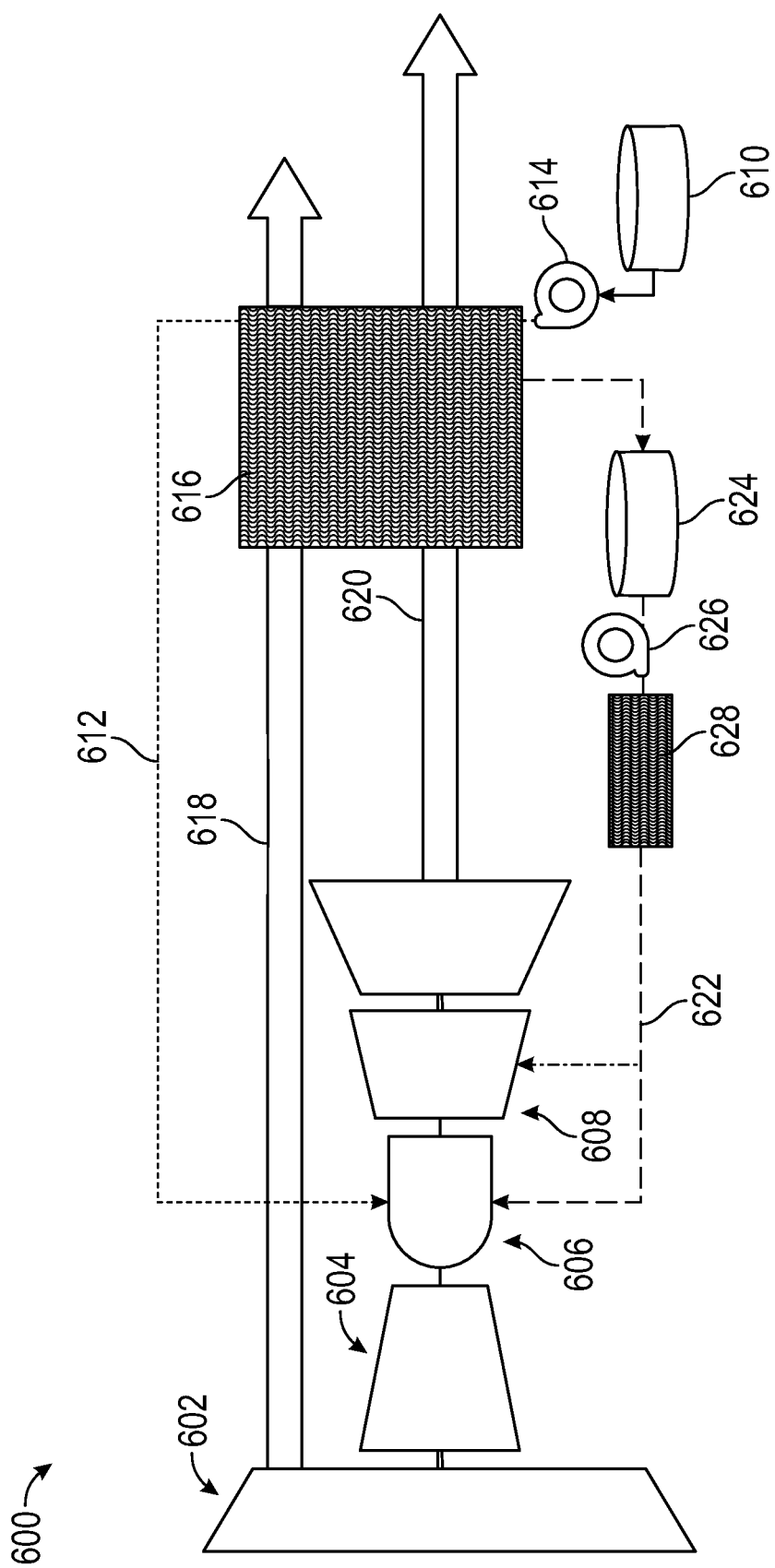
FIG. 6 is a schematic diagram of a hydrogen combustion engine in accordance with an embodiment of the present disclosure.

Turning now to FIG. 6, a schematic diagram of a hydrogen combustion engine 600 in accordance with an embodiment of the present disclosure. The hydrogen combustion engine 600 includes a fan section 602, a compressor section 604, a burner section 606, and a turbine section 608. The compressor section 604, the burner section 606, and the turbine section 608 define a Brayton cycle of the hydrogen combustion engine 600. The burner section 606 includes a combustion chamber configured to mix and burn a fuel, such as hydrogen, the combustion of which generates gaseous water as a byproduct of the combustion operation. The hydrogen fuel is sourced from a cryogenic fuel tank 610. The cryogenic fuel tank 610 is employed to store the hydrogen fuel at cryogenic temperatures in order to reduce the size of the fuel tank. The fuel may be stored as a liquid within the cryogenic fuel tank 610 and converted to a gaseous state prior to injection into the burner section. The fuel is passed through a fuel line 612 by operation of a pump 614 or the like. The fuel may be passed through various heat exchangers, pumps, or the like (not shown) along the fuel line 612. Such components may be used to alter a temperature and/or pressure of the fuel prior to injection into the burner for combustion.

In this illustrative embodiment, the fuel sourced from the cryogenic fuel tank 610 is passed through a condenser assembly 616 arranged downstream, along a core flow 620, from the turbine section 608 and upstream of an exhaust nozzle exit of the hydrogen combustion engine 600. The condenser assembly 616 is arranged to receive two relatively hot fluids (as compared to the cold fuel from the fuel tank 610). As shown in this embodiment, bypass flow 618 is directed from the fan section 602 to the condenser assembly 616 and bypasses the hot portions of the hydrogen combustion engine 600 (e.g., bypasses the burner section 606). The condenser assembly 616 is also arranged to receive relatively hotter air (combustion byproducts) from the core flow 620 that is an exhaust stream from the burner section 606 that is expanded through the turbine section 608. The expansion of the combustion exhaust through the turbine section 608 is used to generate work (e.g., drive rotation of a shaft of the hydrogen combustion engine 600). As such, the condenser assembly 616 is configured to cause a first heat exchange from the relatively hotter core flow 620 to the bypass flow 618, and a second heat exchange from the core flow 620 to the relatively cooler fuel and thus the fuel may be heated to appropriate temperatures for burning (e.g., convert from liquid to gaseous state). It will be appreciated, and as noted above, that other heat exchangers, pumps, or other mechanisms may be used control the temperature and/or pressure of the fuel prior to injection into the burner section 606 for combustion thereof.

As the fuel is passed through the condenser assembly 616, the cold fuel causes condensation of the air of the exhaust in the core flow 620 within the condenser assembly 616 to generate water which can be condensed from the exhaust from the combustor section 606. For example, as a liquid (cold) hydrogen fuel is passed through the condenser assembly 616, the hot temperature of the core flow 620 may be cooled sufficiently to cause water to condense from a vapor form into liquid water. In accordance with embodiments of the present disclosure, the final stages of condensation within the condenser assembly 616 may be achieved through rejecting heat into the much colder source of fuel (e.g., liquid hydrogen fuel).

The water from the exhausted core flow 620 may then be condensed out as the combustion exhaust passes through the condenser assembly 616. In some embodiments, a water collector or water separator may be used in combination with the condenser to ensure extraction thereof. The water may then pass through a water line 622 and may be collected within a water storage 624. In contrast to other embodiments of the present disclosure, hydrogen combustion engine 600 of FIG. 6 does not include an evaporator arranged along the core flow path. In this illustrative embodiment, a pump 626 may direct a flow of liquid water into a boiler 628 to boil and evaporate the water to then inject steam back into the core flow path (e.g., at the combustor of the burner section 604). The boiler 628 may be an electric boiler, a heat exchanger having cross flow with other hot liquids, or the like. In some embodiments, the boiling and reinjection of steam or water into the core flow path may be omitted. For example, in some embodiments, the water may be dumped overboard or stored and used for other purposes onboard an aircraft (e.g., engine systems and/or aircraft systems). As shown, in this embodiment (and may be incorporated into the above disclosed embodiments), the water or steam may be injected into the core flow path at the burner section 606 or at the turbine section 608, a combination thereof, or into other points of injection along the core flow path.

In accordance with some embodiments of the present disclosure, the condenser assembly can extract up to 70% of the water content from the burner exhaust. In some embodiments, the water extraction may be between 20% and 40% of the water content from the burner exhaust. In some embodiments, the inclusion of an evaporator arranged along the core flow path upstream of the condenser assembly can augment or increase the water extraction rate. By removing the water content from the burner exhaust, the mass flow is reduced prior to passing through the exhaust compressor. In some such embodiments, the bulk of the temperature change of the exhaust flow may be achieved through the evaporator which incurs substantial heat pickup in liquid water that is vaporized and then reinjected into the system as steam. The reduced temperature burner exhaust may then pass into and through the condenser assembly for water extraction (e.g., through further cooling as described above).

Advantageously, in accordance with embodiments of the present disclosure, improved efficiencies may be realized in hydrogen burning engines. For example, by inclusion of the condenser assemblies and evaporators described herein, additional efficiency of about 5% may be achieved as compared to other hydrogen burning engines that do not include such components. By significantly cooling the core stream using cryogenic fuels, less cooling is required from cooling air sources (e.g., fan air, ram air, ambient air, etc.) and therefore less pressure loss may be incurred due to the inclusion of a condenser for extracting water from the core exhaust flow. The water may then be vaporized into steam which can be injected into the combustor and/or turbine sections of the engine to improve efficiencies thereof.

As used herein, the terms "about" and "substantially" are intended to include the degree of error associated with measurement of the particular quantity based upon the equipment available at the time of filing the application. For example, "about" or "substantially" may include a range of ±8%, or 5%, or 2% of a given value or other percentage change as will be appreciated by those of skill in the art for the particular measurement and/or dimensions referred to herein. The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. An aircraft engine, comprising:
   a burner section and a turbine section arranged along a shaft, wherein an exhaust from the burner section is directed through the turbine section to drive rotation of the turbine section and a core flow path passes through the burner section and then the turbine section;
   a condenser assembly arranged downstream of the turbine section along the core flow path; and
   a cryogenic fuel source configured to supply fuel to the burner section along a fuel line,
   wherein the fuel line passes through the condenser assembly and the fuel within the fuel line is configured to pick up heat from the exhaust from the burner section and condense water therefrom.

2. The aircraft engine of claim 1, further comprising an evaporator configured to convert the condensed water from liquid water to steam.

3. The aircraft engine of claim 2, wherein the steam is injected into the burner section.

4. The aircraft engine of claim 2, wherein the steam is injected into the turbine section.

5. The aircraft engine of claim 2, wherein the evaporator is arranged along the core flow path between the turbine section and the condenser assembly.

6. The aircraft engine of claim 2, wherein the evaporator is a boiler arranged separate from the core flow path.

7. The aircraft engine of claim 6, wherein the boiler is an electric boiler.

8. The aircraft engine of claim 1, wherein the burner section is configured to combust hydrogen fuel therein.

9. The aircraft engine of claim 8, wherein the cryogenic fuel source is a cryogenic fuel tank configured to supply hydrogen fuel to the burner section.

10. The aircraft engine of claim 1, wherein the condensed water is stored in a water storage.

11. The aircraft engine of claim 10, further comprising a water pump configured to pump water from the water storage to at least one of the burner section or the turbine section.

12. The aircraft engine of claim 1, further comprising a fan and a bypass duct configured to direct bypass air past the burner section and the turbine section.

13. The aircraft engine of claim 12, wherein the bypass air is directed through a portion of the condenser assembly to assist the condensing of water from the exhaust from the burner section.

14. The aircraft engine of claim 1, wherein the condenser assembly comprises (i) a burner exhaust-to-air heat exchanger and (ii) a burner exhaust-to-fuel heat exchanger.

15. The aircraft engine of claim 14, wherein the condenser assembly further comprises a water separator arranged downstream from the burner exhaust-to-air heat exchanger and the burner exhaust-to-fuel heat exchanger in a direction of the core flow path.

16. The aircraft engine of claim 14, wherein the burner exhaust-to-air heat exchanger and the burner exhaust-to-fuel heat exchanger are separate heat exchangers.

17. The aircraft engine of claim 1, wherein the condenser assembly comprises three cooling flow paths comprising: (i) a cooling air flow path, (ii) an oxygen fuel flow path, and (iii) a hydrogen fuel flow path.

18. The aircraft engine of claim 17, wherein an exhaust from the burner section passes through the condenser assembly to sequentially thermally interact with the cooling air flow path, then the oxygen fuel flow path, and then the hydrogen fuel flow path to condense water from the exhaust of the burner section.

19. The aircraft engine of claim 1, wherein the condenser is configured to extract up to 70% of the water content from an exhaust from the burner section.

20. The aircraft engine of claim 1, further comprising a compressor section arranged along the core flow path upstream from the burner section and a fan section arranged along the core flow path upstream from the burner section and the compressor section.

* * * * *